US008358917B2

(12) United States Patent
Schmouker et al.

(10) Patent No.: US 8,358,917 B2
(45) Date of Patent: Jan. 22, 2013

(54) DEVICE AND METHOD FOR TIME-SHIFTED PLAYBACK OF MULTIMEDIA DATA

(75) Inventors: Philippe Schmouker, Betton (FR); Robert Forthofer, Rennes (FR); Jean-Ronan Vigouroux, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1041 days.

(21) Appl. No.: 11/793,549

(22) PCT Filed: Dec. 12, 2005
(Under 37 CFR 1.47)

(86) PCT No.: PCT/EP2005/056695
§ 371 (c)(1),
(2), (4) Date: Feb. 13, 2008

(87) PCT Pub. No.: WO2006/063980
PCT Pub. Date: Jun. 22, 2006

(65) Prior Publication Data
US 2009/0142033 A1 Jun. 4, 2009

(30) Foreign Application Priority Data

Dec. 17, 2004 (FR) ..................................... 04 53046

(51) Int. Cl.
*H04N 5/783* (2006.01)

(52) U.S. Cl. ....................................... 386/349; 386/350

(58) Field of Classification Search .................. 386/349, 386/350
See application file for complete search history.

(56) References Cited

U.S. PATENT DOCUMENTS

| 5,859,821 | A | 1/1999 | Koya et al. | |
|---|---|---|---|---|
| 6,762,797 | B1 | 7/2004 | Pelletier | |
| 2002/0051010 | A1* | 5/2002 | Jun et al. | 345/723 |
| 2003/0070182 | A1* | 4/2003 | Pierre et al. | 725/135 |
| 2003/0072556 | A1 | 4/2003 | Okujima et al. | |
| 2003/0112261 | A1 | 6/2003 | Zhang | |
| 2003/0154479 | A1* | 8/2003 | Brenner et al. | 725/40 |
| 2004/0109674 | A1* | 6/2004 | Ohmori | 386/69 |

FOREIGN PATENT DOCUMENTS

| CN | 115848 A | 11/1996 |
|---|---|---|
| CN | 1158481 | 9/1997 |
| EP | 0772198 B1 | 10/1996 |
| FR | 2851873 | 9/2004 |
| JP | 2000339857 | 12/2000 |

OTHER PUBLICATIONS

Lu et. al. "video summarization by video structure analysis and graph optimization", 2004, Multimedia and Expo, 2004. ICME '04. 2004 IEEE International Conference on Multimedia and Expo (ICME), pp. 1959-1962 vol. 3.*
Search Report Dated Feb. 17, 2006.

* cited by examiner

*Primary Examiner* — Kambiz Zand
*Assistant Examiner* — Michael Guirguis
(74) *Attorney, Agent, or Firm* — Tutunjian & Bitetto, P.C.

(57) ABSTRACT

The invention relates to a method and a device for time-shifted playback of audio/video data. The device comprises:
  means of storing audio/video data received,
  means of recording said audio/video data received on said storage means,
  means of displaying said audio/video data received as it is recorded,
  means of pausing at a given time the display of said audio/video data while continuing to record it.
According to the invention,
  on switching back to playback mode, said display means display a summary of the audio/video data received during the pause before resuming the playback of said audio/video data received in real time.

6 Claims, 4 Drawing Sheets

DEVICE AND METHOD FOR TIME-SHIFTED PLAYBACK OF MULTIMEDIA DATA

This application claims the benefit, under 35 U.S.C. §365 of International Application PCT/EP2005/056695, filed Dec. 12, 2005, which was published in accordance with PCT Article 21(2) on Jun. 22, 2006 in English and which claims the benefit of French patent applications No. 0453046, filed Dec. 17, 2004.

The invention relates to a device and a method for the time-shifted playback of audio/video data.

Digital decoders are now more and more commonly equipped with mass storage means enabling audio/video programmes to be recorded live.

A number of digital decoders have sophisticated functionalities such as the facility to record and display programmes transmitted in real time. They also have time-shifted playback functionalities enabling users to display a programme while recording it, execute a pause in playback while continuing to record it and resume the display of the data using the recorded data.

A drawback of such systems is that, after having initiated a pause, the user watches the audio/video data with a certain delay relative to its transmission. This can be particularly disadvantageous in the case of events taking place in real time and, more particularly, in the context of sporting events to which the live mode display is particularly well suited.

The invention therefore offers the facility for the user to restart the display after a more or less long pause time while not missing the important events that might have occurred during the pause time.

To this end, the invention proposes a device for time-shifted playback of audio/video data comprising:
 means of storing audio/video data received,
 means of recording said audio/video data received on said storage means,
 means of displaying said audio/video data received as it is recorded,
 means of pausing at a given time the display of said audio/video data while continuing to record it.
According to the invention
 on switching back to playback mode, said display means display a summary of the audio/video data received during the pause before resuming the playback of said audio/video data received in real time.

The invention therefore makes it possible to resume the display of the audio/video data received after a pause time while first displaying the most important data received during the pause time. In this way, the user does not lose the important moments and can gradually resume the display of the data received in real time. This presents a certain advantage compared to the known time-shifted playback devices in which the user displays the audio/video data received with the delay due to the pause when he has requested a pause and therefore does not catch up on the live mode display.

According to a preferred embodiment, the device comprises means of creating the summary of the audio/video data received as it is received.

Advantageously, said summary is received with the audio/video data.

Such an embodiment is particularly well suited to encoding formats in which it is possible to associate additional information such as metadata with the transmitted stream.

In a preferred manner, the means of creating the summary extract the important representative moments from the audio/video data received while the display is stopped.

According to an embodiment, the means of creating a summary mark the audio/video data before it is recorded so as to identify the audio/video data forming the summary.

According to a preferred embodiment, the means of creating a summary create a file containing the audio/video data corresponding to the representative moments of the audio/video data recorded while the display is stopped.

Preferably, the means of creating a summary create a summary from the audio data and video data received while the display is stopped.

Preferably, the means of creating a summary detect the end of the data to be retained in the summary by analysing the video data and detect the start of the data to be retained by analysing the video data.

The invention also relates to a method for time-shifted playback of audio/video data in a recording and display device comprising storage means, comprising steps for:
 storing the audio/video data received,
 recording the audio/video data received on said storage means,
 displaying the audio/video data received as it is recorded,
 pausing at a given time the display of the data while continuing to record it,
 characterized in that it comprises
 a step, on switching back to the playback mode, for displaying said summary before resuming the playback of the data received in real time.

The invention will be better understood and illustrated by means of exemplary embodiments and advantageous implementations, in no way limiting, with reference to the appended figures in which:

FIG. 1 represents an example of a device according to the invention representing the data streams in a normal operating mode, FIG. 2 represents an example of a device according to the invention representing the data streams when the display of a programme is paused, FIG. 3 represents an example of a device according to the invention representing the data streams on switching to the summary display mode, FIG. 4 represents a state machine representing the detection of highlights of a programme from the audio component.

The modules represented in the various figures are functional units, which may or may not correspond to physically distinguishable units. For example, these modules, or some of them, can be combined in a single component, or form functionalities of a particular piece of software. On the other hand, certain modules may, if necessary, be made up of physically separate entities.

FIG. 1 represents the operating mode in which the data is recorded and transmitted in real time as known from the prior art.

Figure 1:
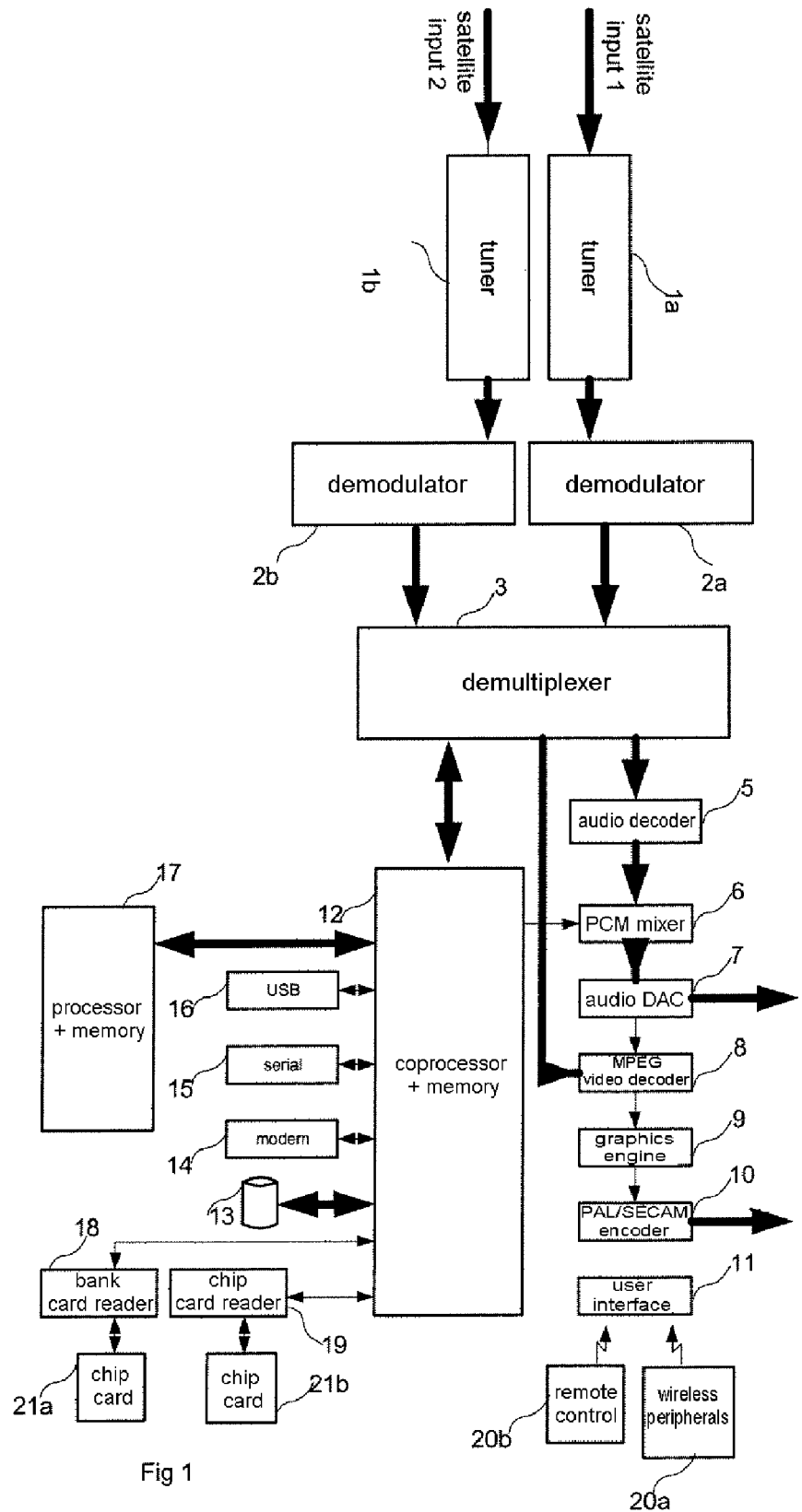
FIGS. 1 to 3 represent an example of a device according to the invention illustrating the various operating modes and the data paths in these various operating modes.

The device represented is preferably a digital decoder, or "set-top box".

The set-top box comprises two tuners 1a and 1b, for receiving two satellite programmes. The two tuners 1a and 1b are respectively connected to demodulators 2a and 2b. The outputs of the demodulators 2a and 2b are connected to a filtering and demultiplexing module 3. This module 3 is used to recover the various programmes from the streams received from the satellites. These various programmes are filtered according to their identifier (PID). The module 3 is connected to a coprocessor 12. The coprocessor 12 relieves a host processor 17 of the tasks associated with managing the peripheral links connected via dedicated buses.

The coprocessor 12 is linked to various interfaces and, in particular:
- to a USB interface 16,
- to a serial interface 15,
- to a modem 14,
- to a hard disk 13,
- to a chip card reader 19,
- to a payment-dedicated chip card reader 18,
- to a host processor associated with an SDRAM type host memory.

The coprocessor 12 is also connected to a PCM mixing module 6.

The chip card readers 18 and 19 respectively accommodate chip cards 21b and 21a.

The host processor 17 runs the applications offered by the programme broadcaster and drives the coprocessor 12.

In this operating mode, the data received on the tuners 1a and 1b is recorded on the hard disk 13. It is also transmitted to audio and video outputs respectively via digital/analogue converters 7 and a PAL/SECAM encoder 10 in order to be displayed.

Recording

In order to be recorded on the hard disk 13, the data is transferred from the tuners 1a and 1b to the demodulators 2a or 2b and then transmitted to the demultiplexer 3.

The audio/video data is transmitted undemultiplexed to the coprocessor 12.

The audio/video data stream is recorded on the hard disk 13 by the coprocessor 12.

Display

As the data is recorded, it is displayed. For this, the audio data is transmitted from the demultiplexer 3 to an audio decoder 5. The audio data is then transmitted to a PCM mixing module 6.

The audio data is then transmitted to a digital-analogue converter 7 before being transferred to an audio output in order to be listened to.

The video data is transmitted as output from the demultiplexer 3 to an MPEG-2 type decoder 8. The decoded data is then transmitted to a graphics card 9 and to a PAL/SECAM encoder depending on the display device.

Figure 2:
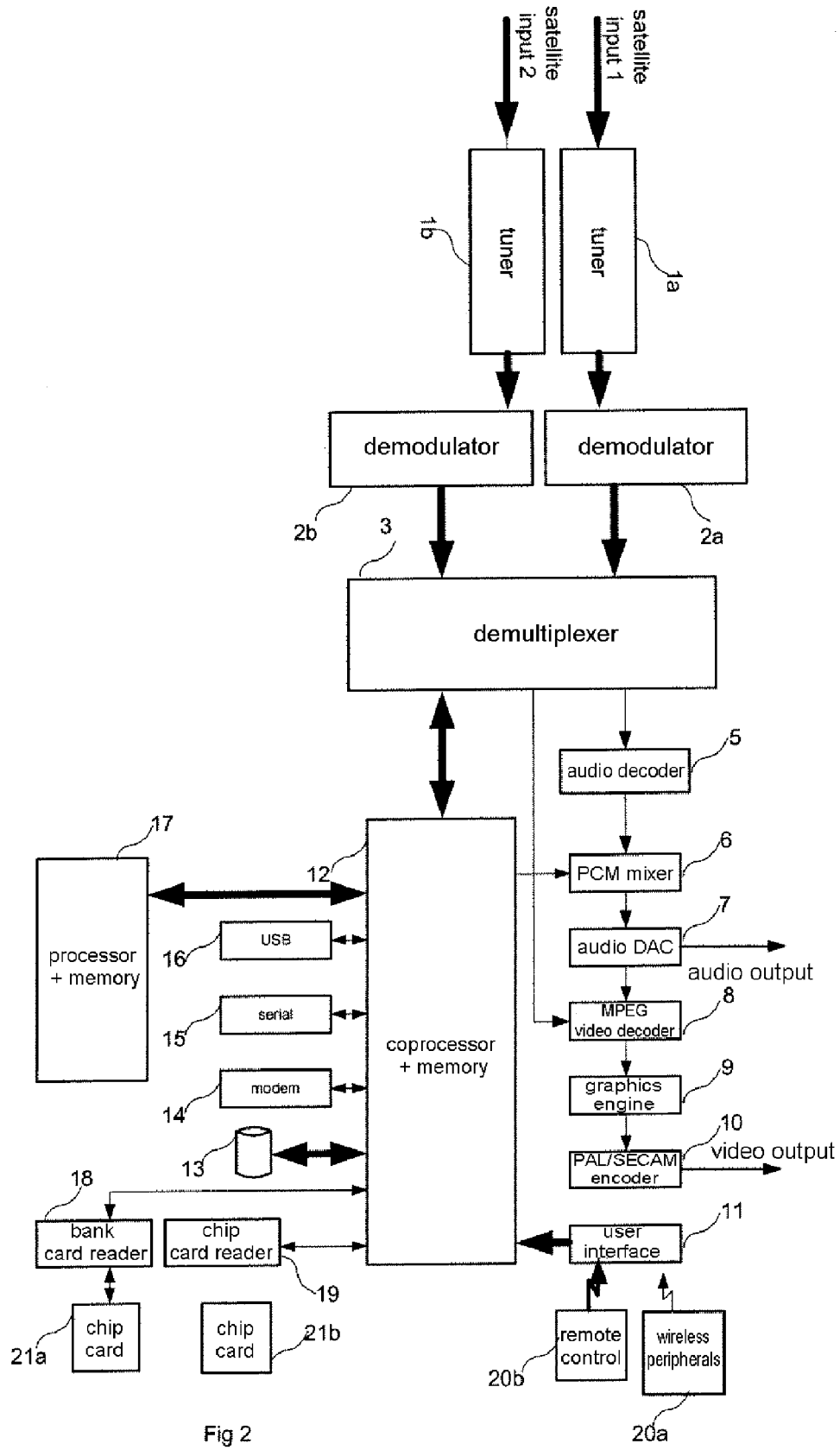

FIG. 2 represents the operation of the same device as described in FIG. 1, on a request to pause the display.

When the pause button is pressed, the device continues to record the data on the hard disk 13. However, the data is no longer transmitted to the various modules involved in the display.

The audio/video data is therefore transmitted from the output of the demultiplexer 3 to the coprocessor 12. The coprocessor 12 transmits the audio/video data received to the hard disk 13. The processor 17 creates the summary of the audio/video data received.

Depending on the preferred embodiment, the processor 17 creates a summary of the data that it receives as it is received. The duly created summary is also recorded on the hard disk 13.

The processor 17 continues to generate the summary as long as the device is not switched back to display mode.

In order to create the summary, there are a number of methods.

According to this preferred embodiment, the processor 17 uses both the audio data and the video data to create the summary. The processor 17 first analyses the audio components. It thus detects the important moments of the event. If the audio can be used to detect audience reactions at sporting events, often the audience reaction occurs at the end of the highlight to be retained in the summary. A subsequent detection of the changes of shot by analysis of the video components then complements the robustness of the method of detection of the changes of shot and can be used to obtain the starting scene of the event to be retained in the summary.

The summary comprises the best moments of the programme received while the display is paused. In other embodiments, it is also possible for the summary to contain only certain particular sequences representative of certain events. For example, for a football match, it is possible for the summary to contain only the goals. These preferences can be entered by the user via the user interface 20b.

Figure 4:
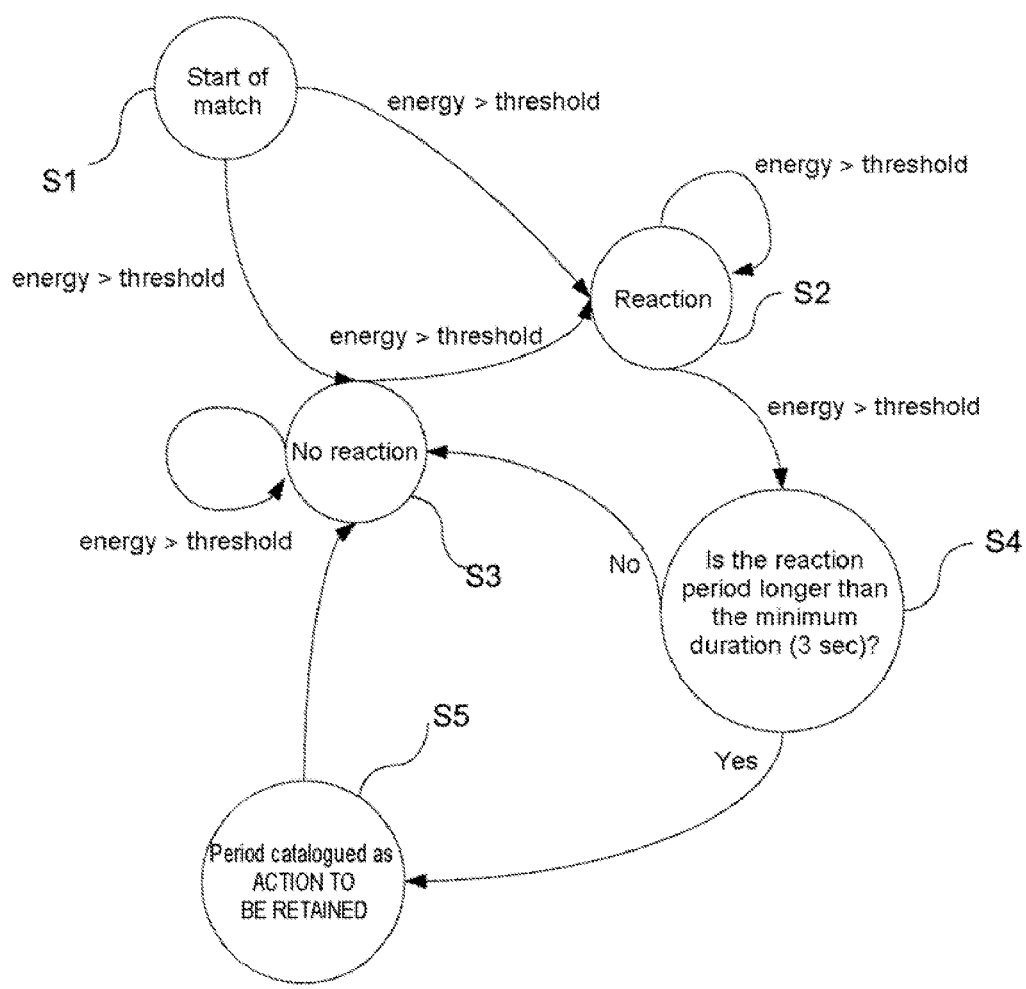

FIG. 4, described later, explains how the audio components are taken into account to construct the summary.

An automatic summary construction method taking into account the audio and video components is also described in US patent application US 2003/0112261, filed on 14 Dec. 2001 in the name of Tong Zhang.

As the audio/video data is received, the data is transmitted to the processor 17 which constructs the summary in live mode so that the summary is available when the device switches back to playback mode. The summary data is portions of the incoming video stream repeating the important moments of the transmitted event. These various portions of the received stream are recorded in file form on the hard disk 13.

The detection of the important moments from the video is based on the detection of changes of shot and scenes. Such a method is, for example proposed in the French patent application published on 3 Sep. 2004 under the number FR2851873, in the name of Thomson Licensing SA and filed on 1 Jul. 2003.

When the transmitted programme is a sporting event, the automatic construction of a summary comprising the best moments is particularly relevant, the viewers being particularly attentive to moments in the game such as goals, free kicks in the case of a football match, or even winning points in a tennis match.

In other embodiments, it is also possible for the construction of the summary not to consist in extracting the important moments so as to generate another data stream comprising only the summary data. It is possible for the construction of the summary to consist in marking the stream so as to delimit the important scenes. On playing back the stream, the playback pointer then plays back only the images of the marked scenes. The marking of the important scenes is carried out in the same way as the construction of the summary, by analysing the audio and video components.

In this way, the data is recorded as it is received, only the addresses of the pointers or markers are stored so as to play back only the important scenes when viewing the summary.

When the device is in a pause mode, the processor 17 constructs a summary or a marking of the data received as it is received.

Figure 3:
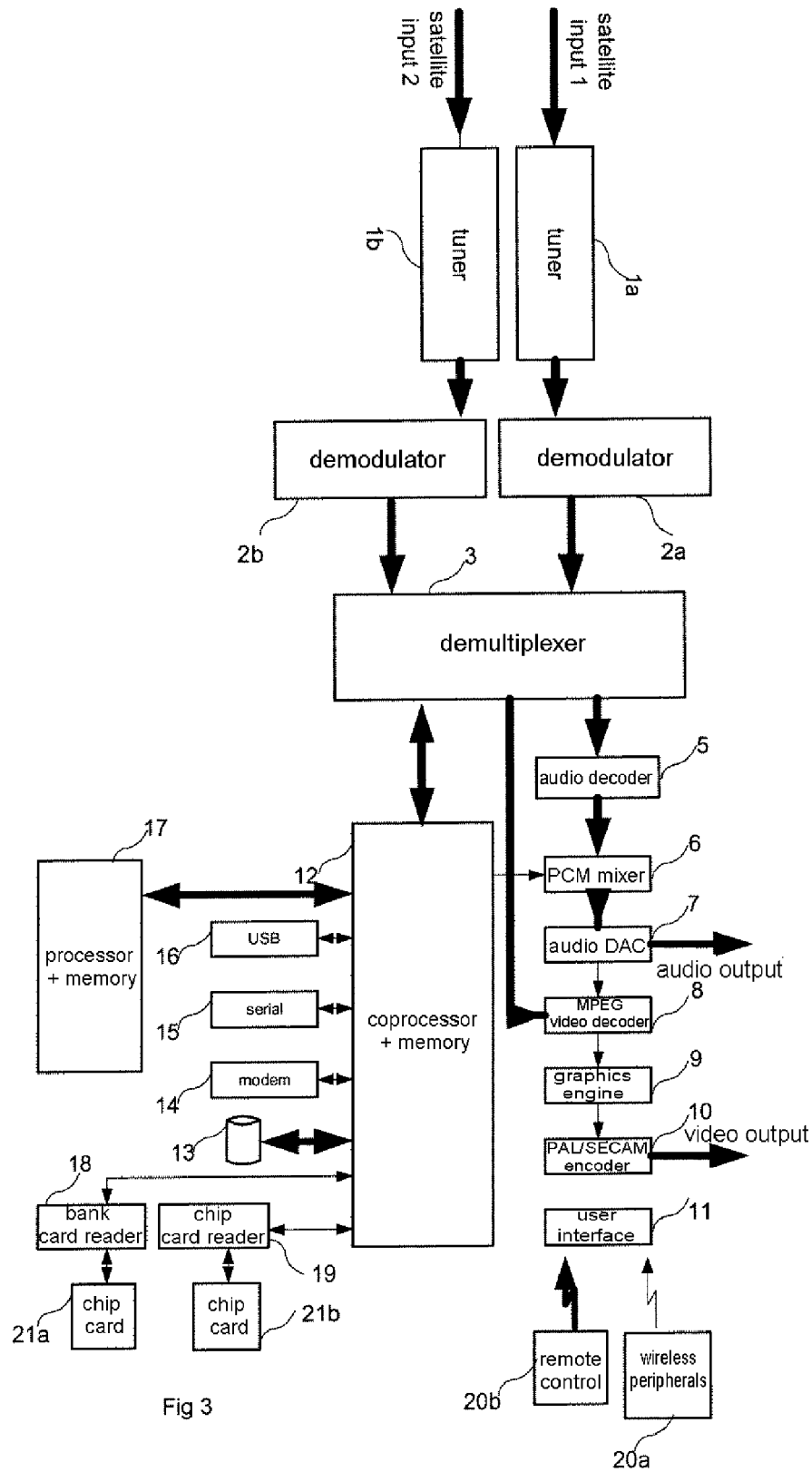

FIG. 3 represents the operation of the same device as described in FIGS. 1 and 2, on a request to resume display after a pause.

When the user wants to resume the display of a programme that he had previously started to view, he reverts to the display mode. The data recorded during the pause time is then displayed onscreen in the form of a summary. In this way, the user rapidly and efficiently views the programme transmitted during the pause time, enabling him to quickly catch up with the live transmission.

For this, on detecting the restart mode (end of pause), the processor 17 sends to the coprocessor 12 the information relating to the summary created and being created so that the coprocessor 12 reads the audio/video data of the summary on the hard disk 13 and transmits the audio/video data to the MPEG video decoding module 8 via the demultiplexer 12 and the audio data to the PCM decoding module 6 via the multiplexer 3. The data is then transmitted to the display module via modules 7 for the audio and via modules 9 and 10 for the video components.

The information concerning the summary transmitted from the processor 17 to the coprocessor 12 comprises the start address of the summary on the hard disk.

When a summary is not created separately from the data but only the important moments are identified by pointers, the playback pointers are transferred from the processor 17 to the coprocessor 12 which reads the corresponding audio/video data from the hard disk 13.

The summary is thus displayed until the data recorded on the hard disk 13 has all been summarized. While displaying the summary, additional information is displayed, indicating to the user that the data he is viewing is summary data. Similarly, on switching to the live display mode, the user is informed by a message onscreen that it is switching back to live mode.

Thus, since the summary data is less voluminous than the totality of the programme, it is possible to catch up on the live transmission. When the live transmission is caught up, the device switches back to the live display mode as described in FIG. 1. This is particularly advantageous for sporting events where, on the one hand, the viewer wants to view the important moments of a match and where, on the other hand, he wants to view the event live and does not therefore want to remain in time-shifted playback mode too long.

If the user presses pause while he is viewing the summary data, then the construction of the summary continues automatically as described previously until the display mode resumes. All the summary data created during the first pause and created during the second pause will be displayed in succession before switching back to live mode.

FIG. 4 represents a state machine illustrating the recognition of the audio data in the construction of the summary, enhancing the robustness of how important scenes are detected.

The method is based on the assumption that the audience react when an event occurs in a programme displaying a sporting event or in other types of events such as American-style "talk shows" in which the audience is required to contribute strongly. Audience reactions are sought by detecting energy peaks in the audio signal. When this reaction is long enough, it is assumed that the period concerned is interesting.

The energy level depends on the action taking place, but also depends on the audience or other factors. Moments when the audience reacts more during the event are therefore sought.

If mE denotes the mean of the energy of the signal from the start of the match, there is an energy peak if the computed energy is greater than the calculated mean mE.

More precisely, it is possible to retain those peaks for which the energy is greater than $mE+k*\sigma E$, in which $\sigma E$ represents the standard deviation of this same energy, from the start of the match. The parameter k can be used to reduce the number of peaks detected.

To be certain that the peak actually corresponds to an interesting period in the event, it is important to take into account the duration of the peak. In certain cases, on average, it is possible to estimate this time at 3 seconds. This time is normally dependent on the audience.

This method is described with reference to FIG. 4 representing a state machine.

At the start of retransmission, state S1, the energy is measured. If the energy is greater than the predetermined threshold as described previously, then it is estimated that there is potentially a reaction and there is a switch to the state S2. The state S2 is maintained as long as the energy is greater than the threshold level. During this time, the time during which the state S2 is maintained is estimated. When the energy falls below the threshold level, there is a switch to the state S4. In this state S4, the time for which the state S2 was maintained is estimated. If it was maintained for a duration longer than the minimum duration, then this action is considered to be an important action and it is filed among the moments to be retained, then there is a switch back to the waiting state S3 in which the energy peaks are observed. Otherwise, if this action has not lasted long enough, then this period is classified as uninteresting and there is a switch back to the waiting state S3. The state S3 is maintained as long as the energy is below the threshold as described previously.

The audio and video combination can be used to enhance the robustness of how the important moments are detected, the sound being particularly important in the case of sporting events.

The invention is not limited to the exemplary embodiments given in the description and in particular not to sporting events, but to any televisual programme. It also applies to data encoded according to standards other than the MPEG-2 standard. It also applies to types of decoders other than satellite set-top boxes, and in particular ADSL decoders, and any type of equipment that can be used to record and play back audio/video data.

The invention also relates to another embodiment in which the summary is created by the broadcaster and transmitted to the decoder in the form of metadata in the audio/video stream. The duly received summary is demultiplexed in the demultiplexer 3 and recorded on the hard disk 13. The processor 17 is therefore involved only in managing the hard disk 13 to store the summary and the audio/video data.

The invention claimed is:

1. Device for time-shifted playback of audio and/or video data comprising:
    means of storing audio and/or video data received,
    means of recording said audio and/or video data received on said storage means,
    means of displaying said audio and/or video data received as it is recorded,
    means of pausing at the display of said audio and/or video data while continuing to record the audio and/or video data,
    means of triggering the creation of a video summary of the audio and/or video data received during said pause upon detection of a user initiated pause; and
    means of marking the audio and/or video data before it is recorded so as to identify the audio and/or video data forming the summary and to detect a start and end of the audio and/or video data to be retained in the summary by analyzing the content of the audio and/or video data;
    wherein upon switching back to playback mode from pause mode, said display means displays said summary of audio and/or video data before resuming the playback of said audio and/or video data being received in real time.

2. Device according to claim 1, wherein the means of creating said summary determines and extracts important representative moments from the audio or video data.

3. Device according to claim 1, wherein the means of creating said summary mark the audio and/or video data before the audio and/or video data is recorded so as to identify the audio and/or video data forming the summary.

4. Device according to claim 2, wherein the means of creating said summary create a file containing the audio and/or video data corresponding to the determined representative moments of the audio and/or video data recorded while the display is stopped.

5. Device according to claim 1, wherein the means of creating said summary detect the end of data to be retained in the summary by analysing the video data and detect the start of the data to be retained by analysing the video data.

6. Method for time-shifted playback of audio and/or video data in a recording and display device comprising storage means, comprising steps for:
 storing the audio and/or video data received,
 recording the audio and/or video data received on said storage means,
 displaying the audio and/or video data received as it is recorded,
 pausing at a given time the display of the data while continuing to record the data,
 detecting the pause initiated by a user, and in response to said detection, triggering the creation of a video summary of the audio and/or video data received during said pause;
 marking the audio and/or video data before it is recorded so as to identify the audio and/or video data forming the summary and to detect a start and end of the audio and/or video data to be retained in the summary by analyzing the content of the audio and/or video data;
 wherein upon switching back to the playback mode, displaying said video summary before resuming the playback of the data received in real time.

* * * * *